US009881479B2

(12) United States Patent
Smith

(10) Patent No.: US 9,881,479 B2
(45) Date of Patent: Jan. 30, 2018

(54) METHOD AND APPARATUS FOR THE DETECTION AND NOTIFICATION OF THE PRESENCE OF A LIQUID

(71) Applicant: Smith Financial Services, LLC, North Bay Village, FL (US)

(72) Inventor: Chris Smith, North Bay Village, FL (US)

(73) Assignee: Arnold J. Cestari, Jr., Mattapoisett, MA (US)

( * ) Notice: Subject to any disclaimer, the term of this patent is extended or adjusted under 35 U.S.C. 154(b) by 55 days.

(21) Appl. No.: 14/328,483

(22) Filed: Jul. 10, 2014

(65) Prior Publication Data

US 2016/0012708 A1 Jan. 14, 2016

(51) Int. Cl.

*G08B 21/00* (2006.01)
*G08B 21/20* (2006.01)
*G08B 25/10* (2006.01)
*G01F 23/24* (2006.01)
*G01F 23/70* (2006.01)
*G01F 23/00* (2006.01)

(52) U.S. Cl.

CPC ............. *G08B 21/20* (2013.01); *G08B 25/10* (2013.01); *G01F 23/0084* (2013.01); *G01F 23/242* (2013.01); *G01F 23/70* (2013.01)

(58) Field of Classification Search

CPC ........ G08B 21/20; G08B 25/10; G08B 19/00; G05B 11/01; G01F 23/70; G01F 23/74; G01F 23/242; G01F 23/243; G01F 23/265; G01F 23/0069; G01F 23/0084; G01F 23/2928; G01F 23/2965

USPC .............. 340/5.1, 540, 573.6, 604, 618, 984

See application file for complete search history.

(56) References Cited

U.S. PATENT DOCUMENTS 5,130,708 A 7/1992 Boyden
5,142,271 A * 8/1992 Bailey ........................ G01F 1/24 200/81.9 R
5,247,973 A * 9/1993 Brown ................... B67D 7/005 114/343
5,357,247 A 10/1994 Marnel et al.
6,473,004 B1 * 10/2002 Smull ..................... B63B 17/06 114/183 R
6,583,724 B1 * 6/2003 Rodriguez ........... G08B 21/084 340/522
6,718,567 B2 * 4/2004 Gibson ..................... E04H 4/12 340/573.6
6,910,498 B2 * 6/2005 Cazden ..................... E04H 4/12 137/386
7,084,777 B2 8/2006 Ninberg
7,221,282 B1 5/2007 Ross et al.

(Continued)

OTHER PUBLICATIONS

Kuantama et al., Early Flood Alerts Using Short Message Service (SMS), International Conference on System Engineering and Technology (ICSET), 2012.

(Continued)

*Primary Examiner* — John A Tweel, Jr.
*Assistant Examiner* — Adnan Aziz
(74) *Attorney, Agent, or Firm* — Quarles & Brady LLP

(57) ABSTRACT

Systems and methods for providing remote notifications upon the detection of certain conditions. In one embodiment, a device comprising a housing, a power unit, a liquid sensor, and a communications unit detects the presence of a liquid and initiates an alert notification that is transmitted to a remote device.

18 Claims, 3 Drawing Sheets

(56) References Cited

U.S. PATENT DOCUMENTS 7,417,552 B1 8/2008 Vaskovic
7,561,057 B2 7/2009 Kates
7,649,468 B2 1/2010 Gordon
7,661,380 B2 * 2/2010 Waldecker ............... B63J 4/004 114/183 R
7,671,754 B2 3/2010 Heilmann et al.
8,508,373 B2 8/2013 Rice
9,105,175 B1 * 8/2015 Cantolino .............. G08B 21/20
2003/0183001 A1 * 10/2003 Zimmermann ....... G01F 23/246 73/295
2004/0108861 A1 * 6/2004 Germiquet ............ G01F 23/265 324/663
2005/0116839 A1 6/2005 Warren
2005/0242966 A1 * 11/2005 Picco .................... G01F 23/243 340/616
2006/0005312 A1 * 1/2006 Reddy .................... A47K 13/24 4/668
2006/0176193 A1 8/2006 Wraight
2008/0007431 A1 * 1/2008 Jacques .................. G08B 19/00 340/984
2010/0215511 A1 8/2010 Eller et al.
2011/0036164 A1 * 2/2011 Burdi .................... G01F 23/242 73/303
2011/0095914 A1 * 4/2011 Velado ..................... B63J 99/00 340/984
2011/0162906 A1 * 7/2011 Harper ................... G01V 1/135 181/120
2011/0175740 A1 7/2011 Miner
2012/0169490 A1 * 7/2012 Yu ......................... G01F 23/241 340/522
2013/0241727 A1 * 9/2013 Coulombe ............. G08B 23/00 340/517
2014/0015679 A1 1/2014 Campbell
2014/0203665 A1 * 7/2014 Goodman .............. H02H 5/083 307/118
2014/0266574 A1 * 9/2014 Whitson, Jr. ....... G01F 23/0069 340/5.1

OTHER PUBLICATIONS

Asmara, SMS Flood Alert System, Control and System Graduate Research Colloquium (ICSGRC), 2011 IEEE.

* cited by examiner

METHOD AND APPARATUS FOR THE DETECTION AND NOTIFICATION OF THE PRESENCE OF A LIQUID

FIELD OF THE INVENTION

The present teaching relates generally to methods and apparatus for the detection and notification of the presence of certain conditions. In particular, the present teaching relates to methods and apparatus that detect the presence of liquid and transmit an alert directed to a remote user device.

BACKGROUND

Remote monitoring, detection, and notification systems are useful in a variety of fields. In particular, monitoring areas prone to flooding, such as a basement or bilge of a boat, detecting high volumes of liquid in these areas and notifying a remote user of the same are useful in preventing costly property damage caused by hazardous conditions.

In the field of marine vessels, watercraft may be tied to a dock or mooring and left unattended for extended periods of time, during which the watercraft may take on water. Rising water levels within the watercraft, due to inclement weather, leak, severe listing of the boat, bilge pump failure, or low battery charge, can lead to serious property damage that could be avoided by notifying a remote device of certain hazardous conditions, including the presence of excessive fluid in the bilge of a watercraft. The same is also true of basements, vehicles, or other areas subject to potential flood damage.

Existing systems targeted to detecting the presence of rising water levels rely on an external power source that may be compromised during an emergency or are incapable of remotely alerting someone of perilous conditions. For example, the electrical power outlets on a dock may lose power during a storm or the electrical system of the boat itself could be disabled. During such events, the loss of power renders existing monitoring systems useless and without any means for notifying a remote party of impending disaster. Such failures expose a boat owner to significant risk of damage or even loss of their vessel.

Thus, there is a substantial need for methods and apparatus for detecting the presence of liquids and alerting a remote device of the presence of the same. There is a substantial need for an apparatus that is not dependent on an external power source for detecting the presence of a liquid and alerting a remote device of the presence of the liquid.

SUMMARY

The present teaching is generally directed to methods and apparatus for detecting and providing notifications of certain conditions. Embodiments of the present invention include methods and apparatus that serve to detect and alert a remote device of the presence of liquid, namely water. One embodiment of the present teaching comprises a water detection unit having a watertight housing for a communications system with the capability of sending an alert to a remote user device. One embodiment of the present invention includes a self-contained power source for the device that renders it capable of operating independent of any other system. Certain embodiments of the present teaching are disposable, whereas other embodiments may be configured so as to be reusable, reprogrammable, or rechargeable.

Using the device according to one embodiment is simply a matter of programming the device to send an alert notification to a remote communication device and then placing the device into an area where the presence of liquid is a concern, such as the bilge area of a boat. When the device becomes submerged by water or other liquid, an alert event is triggered and one or more notification messages will be sent to the programmed number of the remote device until the device is no longer submerged. If a boat's onboard or shore power system, bilge pumps, or automatic float switch fail to activate, the boat may begin to take on water and could potentially sink. Because some embodiments of the present invention operate independent of an outside power source, the device may notify a remote communication device of such an event when the water level reaches a predetermined level, alleviating the worry that comes with relying on a vessel's built-in security systems. In one embodiment of the present invention, the device may comprise a housing, a power unit, a sensor unit, and a communications unit.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION

An embodiment of the invention utilizes a network and network devices to alert a device of the presence of liquid in a remote location. Embodiments of the present invention include both apparatus and methods for detecting the presence of liquid and, responsive thereto, automatically transmitting notifications to a remote communications device of the presence of water or other liquid in the bilge of a boat. It should also be understood that the present teaching may be directed to applications outside of detecting water in the bilge of a boat, and may be applied to the monitoring, detection, and alerting a remote device to the presence of other harmful conditions.

One embodiment of the present teaching comprises a water detection unit contained in a small watertight housing with the capability of sending an alert to a remote user device. In one embodiment, the alert is transmitted as an SMS text through a GSM service provider. In one embodiment, the alert is transmitted as an SMS text through a CDMA service provider. One embodiment of the present teaching is completely self-contained with a power source such that the entire device is disposable.

Reference will now be made in detail to one or more embodiments of the present invention, examples of which are depicted in the accompanying Figures.

Figure 1:
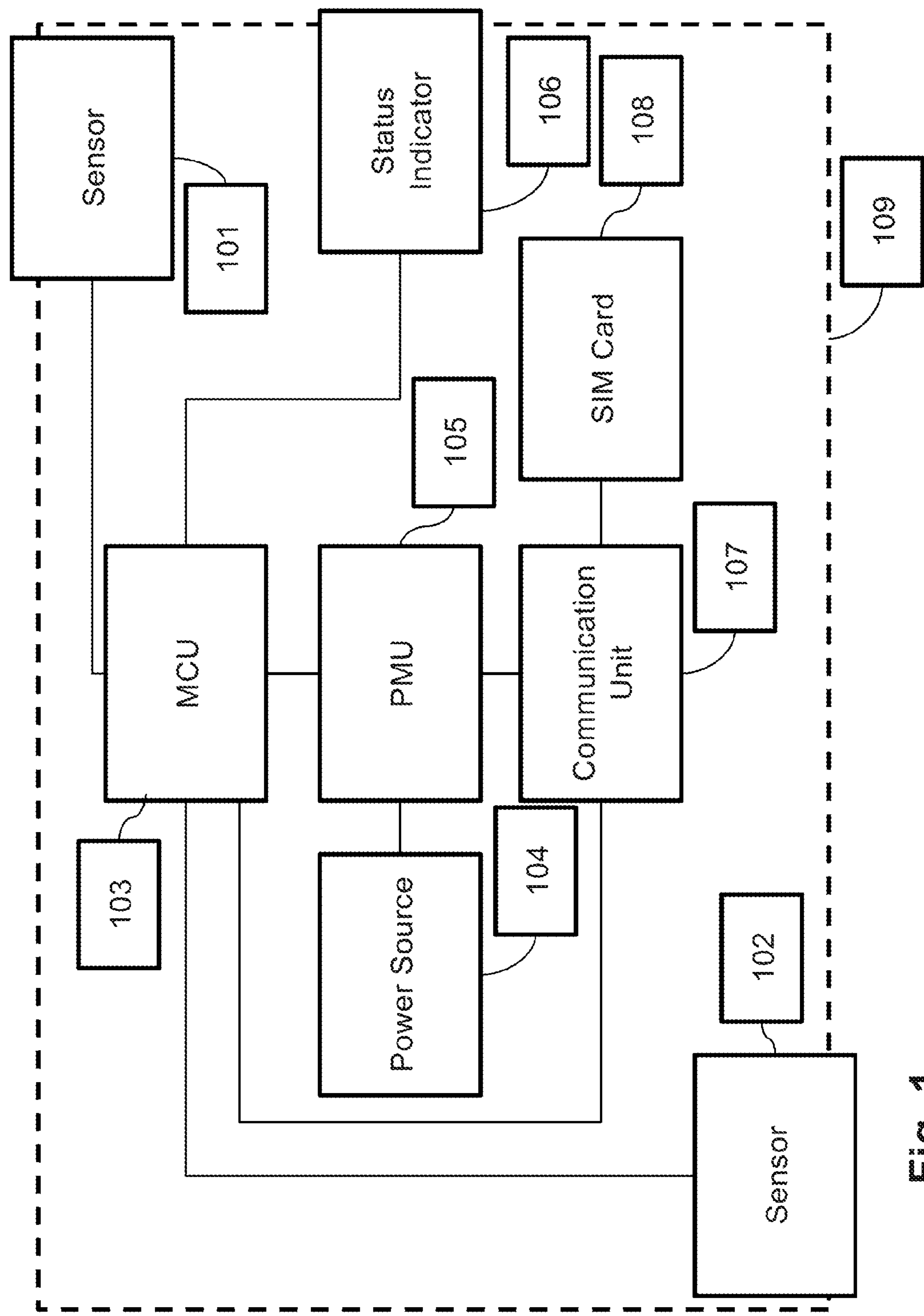
FIG. 1 illustrates a remote monitoring and alert system in accordance with an embodiment of the present teaching.

FIG. 1 depicts one embodiment of the present teaching in which the presence of a liquid is detected and an alert message is transmitted to a remote device. The embodiment of the present teaching depicted in FIG. 1 is an apparatus for detecting and providing notifications of the presence of water or some other liquid to a remote device. The embodiment depicted in FIG. 1 comprises a printed circuit board assembly and components that are completely self-contained within a housing 109. This embodiment of the present teaching has no moving mechanical parts and is moisture resistant. The enclosure may be filled by to ensure the device is waterproof and to provide shock-resistance and structural integrity. In one embodiment, the enclosure may be filled with epoxy or an insulating material. In a preferred embodiment, the housing 109 is in the shape of a cube, but may also be shaped as a sphere, box, cone, or other geometric form allowing space for the internal components to be mounted or otherwise secured within the housing 109. In a preferred embodiment, the housing 109 comprises a plastic cube measuring 4"×4"×4" that is sealed and waterproof.

In the embodiment depicted in FIG. 1, the device includes interface circuitry for multiple sensors 101 and 102 to detect the presence of a liquid. In a preferred embodiment, the sensors 101 and 102 are off-board, mounted on opposite sides of an enclosure such that the sensors are exposed to the device's exterior. In one embodiment, the sensor are placed at opposite sides of the device housing. In an embodiment utilizing a cube-shaped exterior housing, one sensor is placed in or near a corner of the cube and another sensor is placed at or near the opposite corner. A device according to an embodiment of the present teaching is removable or disposable such that the device may be placed in a bilge or other area in which a user desires to be alerted of the presence of a liquid without being permanently affixed to a surface or otherwise installed.

The sensors 101 and 102 are paired with a microcontroller unit (MCU) 103 or full-featured microprocessor with a low power draw that controls the device. In one embodiment, the microprocessor pulls as little as 0.2 mA when operating at 1 MHz clock speed. In a preferred embodiment, the invention utilizes an Atmel ATTiny 1634 microprocessor. In another embodiment, the invention utilizes a Freescale RS08KB12 microprocessor.

In the embodiment depicted in FIG. 1, the MCU 103 is also connected with a status indicator 106, power management unit (PMU) 105, which monitors and maintains the power connection between the power source 104 and the other components of the device, and communication unit 107. In a preferred embodiment, the status indicator 106 is an LED that is visible on the exterior of the housing 109. According to some embodiments, the PMU 105 is a microprocessor that may control or convert the power provided to other integrated circuits and assist or control sleep and power functions. Embodiments of the present teaching may use a primary battery as the power source 104. In a preferred embodiment, the power source 104 comprises 6 D-cell alkaline batteries. Other embodiments may use, but are not limited to lithium Ion, nickel-metal hydride (NiMH), nickel-cadmium (NiCd), or alkaline battery types. In some embodiments the unit is not rechargeable, whereas in others the power source utilizes rechargeable battery technology. In a preferred embodiment, the power source provides sufficient energy to sustain the device for twelve months or more, including sufficient energy to allow for 100 or more transmission events, as described below. In some embodiments of the present teaching, the communications unit 107 includes a GSM Module, CDMA module, or cellular module capable of receiving and transmitting SMS text messages. The communications unit may also include a WiFi chip or other capability to establish wireless communication with an external network or device. In a preferred embodiment, the invention utilizes a SIMCON SIM900 GSM Modem that uses basic AT-style commands received from the microprocessor to control sending and receiving text messages. In some embodiments, the communications unit may include a GSM SIM card interface such that any GSM SIM card can be used to provision the device. In one embodiment, the communication unit 107 is paired with a portable memory chip, such as a SIM Card 108, that may contain device- or user-specific information related to an account. Embodiments of the present teaching may further include an antenna approved for use with the cellular module wherein the antenna is situated to be fully enclosed in the housing 109.

Figure 2:
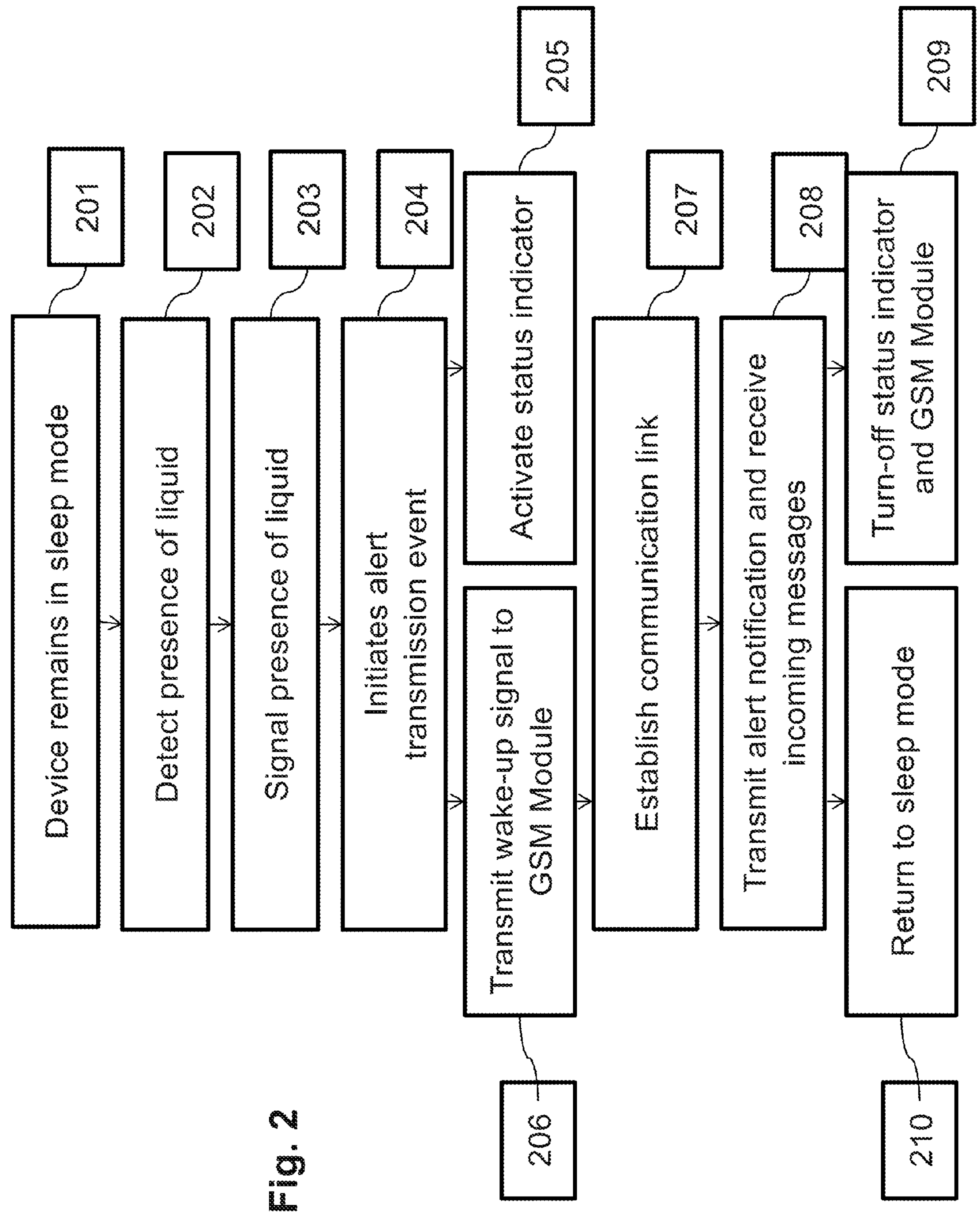
FIG. 2 is a workflow diagram depicting the initiation and execution of an alert transmission in accordance with an embodiment of the present teaching.

FIG. 2 depicts a process by which the a liquid is detected, initiating an alert transmission in accordance with an embodiment of the present teaching. Prior to a transmission event being triggered, the device remains in a sleep mode as depicted in step 201, drawing a minimal amount of current from the device's power source 104. To detect the presence of a liquid in one embodiment as depicted in step 202, a ghost current is run between a MCU 103 and the sensors 101 and 102 such that simultaneous contact on both sensors initiates an alert transmission event.

In the embodiment depicted in FIG. 1, the sensor circuit is completed when both sensors are in contact with a liquid, which notifies the MCU 103 that a liquid has been detected, as depicted in step 203, and initiates an alert transmission event, as depicted in step 204. In one embodiment, both sensors must be in continuous contact with a liquid or the circuit must be complete for a set amount of time before signaling the presence of liquid to the MCU 103. In a preferred embodiment, the circuit must be complete for 8 continuous seconds before signaling the MCU 103 to initiate a transmission event.

Upon the sensors 101 and 102 signaling the presence of a liquid to the MCU 103 or otherwise triggering a transmission event, the MCU 103 activates a status indicator 106, as depicted in step 205, and transmits a wake-up signal to a communication unit 107, as depicted in step 206. In a preferred embodiment, the communication unit 107 remains completely powered off, drawing no current from the power source, except for when powered on by the MCU 103. After receiving a wake-up signal, the communication unit 107 establishes a link with a communications network, such as a cellular network or WiFi connection, as depicted in step 207. Using information provided by the SIM Card 108, the communication unit 107 transmits an alert message to a remote recipient via a communication network, as depicted in step 208. In one embodiment, the alert message is a SMS text message that provides a notification that indicates the sensors have detected the presence of a liquid. The alert message may also include information about the device, including the remaining battery life of the device. The alert message may also include information about an accompanying service or data plan by which the alert message is transmitted. While the device is in communication with the communication network, the device may also receive incoming communications, such as a message reprogramming the device or providing recipient information or telephone number to which future alerts should be transmitted.

Once an alert message has been sent, incoming messages have been received, or after a set period of time after the connection to the communication network has been established, the MCU 103 shuts off the status indicator 106 and the communication unit 107, as depicted in step 209, and returns the device to sleep mode, as depicted in step 210. In one embodiment, after transmitting an alert message, the device is placed into a lock-out period, during which the device is locked in sleep mode. The lock-out period may fall within a wide range of time periods, from a matter of seconds to a matter of days.

Programming Recipient Information

Figure 3:
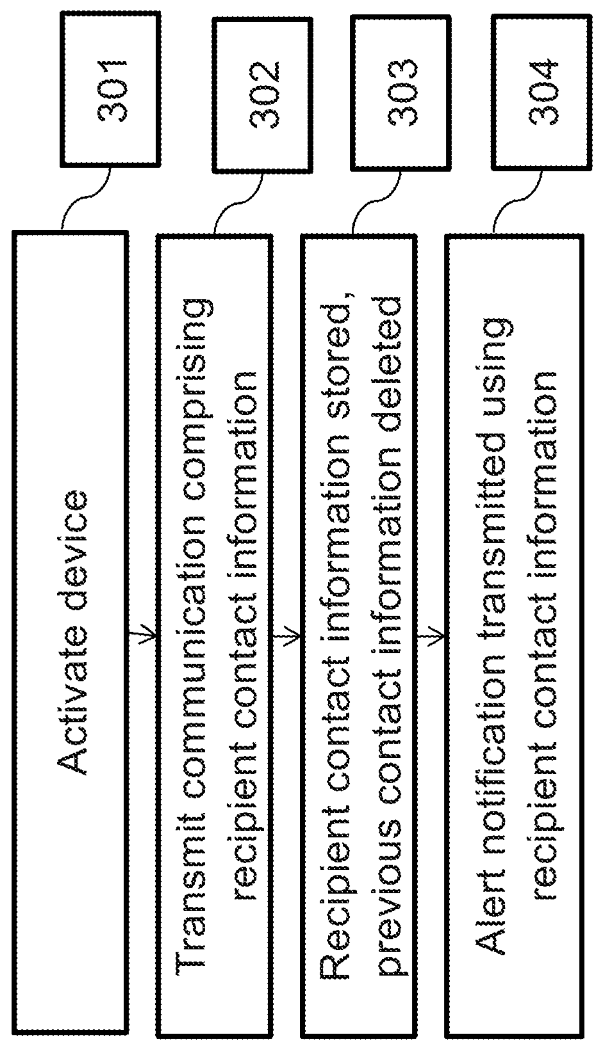
FIG. 3 depicts the process for programming a device in accordance with an embodiment of the present teaching.

The present teaching is directed to detecting the presence of a potentially hazardous condition and alerting a remote device when the condition is present. In some embodiments, a device according to the present teaching may be programmed to transmit the alert to a user-specified device. In one embodiment depicted in FIG. 3, the process for programming the device comprises entering a unit ID number specific to the device being programmed and entering the unique address or telephone number of the remote recipient device into a text message or other electronic transmission that is then submitted to the device via a communication network. By way of example, in one embodiment, a user activates the device, as depicted at step 301, and transmits an communication, such as a text message or other electronic communication, to the device that includes recipient contact information, as depicted at step 302. In one embodiment, the a text message comprising the string "#program xxx-xxx-xxxx" or a similar entry. Upon receipt of the message, the device stores the phone number "xxx-xxx-xxxx" that was included in the text message and deletes any previously stored number, as depicted at step 303. This new number "xxx-xxx-xxxx" will be used by the device for all subsequent outgoing alert texts, as depicted at step 304. In one embodiment, upon receiving the first programing text an expiration clock will begin and is set to expire after a given period of time. If after being woken by contact of water sensors in one embodiment of the present teaching, no incoming text is received within some set period of time—30 seconds for example—the cellular module will be powered down, LED will power off, and the product will be put into a low-power sleep mode.

Testing a Device

A user may wish to test a device according to the present teaching to confirm the device is operational, to check the device's battery life, or to check the device's remaining data allotment. In one embodiment of the present teaching, a user may manually activate the device by simultaneously holding or pressing a finger to each sensor 101 and 102 for a proscribed period of time. This triggers the MCU 103 to activate the status indicator 106, transmit a wake-up signal to the communication unit 107, and proceed with transmitting a message to a remote device via a communication network, as otherwise described above.

The various apparatus and methods discussed herein may be implemented between telecommunication devices that are connected through a telecommunication network, over the Internet, or via a combination thereof. One skilled in the art will recognize that the present invention can transmit notifications that may be received using any type of telecommunication device, including, for example, conventional telephones, wireless telephones, cellular telephones, personal digital assistants (PDAs), personal communication devices, smart phones, tablet computers, handheld email devices, handheld computers, desktop computers, laptop computers, or any communication device capable of transmitting and receiving information via a video or telecommunication related service. Telecommunication devices may be capable of providing voice services and/or data services over networks such as GSM/GPRS/EDGE, UMTS, CDMA, WiFi, WiMAX, 3G, 4G, LTE, EVDO, mesh, or other networks types. Accordingly, any particular structure and design of the telecommunication devices is merely one example of a physical device for implementing the techniques of the present invention, and is presented for illustrative purposes and not to imply any limitations on the scope of the present invention.

As will be understood by those skilled in the art, the invention may be embodied in other specific forms without departing from the spirit or essential characteristics thereof. For example, the particular architecture depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. In addition, the present invention may be implemented as a method, process, user interface, computer program product, system, apparatus, or any combination thereof. Accordingly, the disclosure of the present invention is intended to be illustrative, but not limiting, of the scope of the invention. It is intended that the present invention cover all such modifications and variations of the invention, provided they come within the scope of the appended claims and their equivalents.

I claim:

1. An apparatus comprising:

a sealed waterproof shock-resistant housing having at least one set of first and second volume diagonally opposed corners located on opposite sides of the housing, said housing having a generally cube shape which is configured to be disposed in a marine vessel bilge, and wherein said housing is easily removable from said bilge without being permanently affixed to a surface or otherwise installed;

a power unit contained within the housing;

a first liquid sensor disposed at the first housing corner and a second liquid sensor disposed at the second housing corner, wherein a portion of each of the liquid sensors extends outside the housing, and wherein the presence of a liquid is only detected as the result of simultaneous contact by the liquid with both the first sensor and the second sensor, and wherein the first and second sensors comprise one or more electronically conductive components coupled to the power unit; and a communication unit contained within the housing.

2. The apparatus according to claim 1 wherein the housing is filled with epoxy.

3. The apparatus according to claim 1 wherein the housing is filled with an insulating material.

4. The apparatus according to claim 1, further comprising a microcontroller unit coupled with each of the sensor unit, power unit, and communication unit.

5. The apparatus according to claim 1, further comprising an indicator for signaling that the apparatus is functioning.

6. The apparatus according to claim 1, wherein the power unit comprises one or more alkaline batteries.

7. The apparatus according to claim 1, wherein the communication unit comprises a GSM module.

8. The apparatus according to claim 1, wherein the communication unit comprises a GSM module paired with a memory.

9. The apparatus according to claim 1, wherein the communication unit is capable of transmitting notifications over a communications network, said notifications comprising information indicating that the liquid sensors have detected the presence of a liquid.

10. The apparatus according to claim 1, wherein the communication unit is capable of transmitting notifications over a communications network, said notifications comprising information regarding the remaining life of the power unit.

11. The apparatus according to claim 1, wherein:

said communication unit is capable of transmitting notifications over a communications network, and is coupled to a microprocessing unit, wherein said microprocessing unit is fully contained within the housing and is coupled to the first and second liquid sensors;

said apparatus further comprising a power control and conversion unit, fully contained within the housing, that regulates connections between the power unit and one or more other components of the apparatus; and a memory, fully contained within the housing, that is coupled to the communications unit.

12. An apparatus for detecting a presence of a liquid and transmitting alert notifications to a remote device comprising:

a watertight, plastic, cube-shaped housing, wherein the cube-shaped housing measures no more than 12 inches in height and is filled with an insulating material;

two liquid detection sensors wherein the first sensor is located in a first corner of one side of the cube-shaped housing and the second sensor is located in a second corner on a second opposite side of the cube-shaped housing, wherein the second corner is volume-diagonal to the first corner, wherein said housing is easily removable from a bilge of a marine vessel and is not permanently affixed to a surface or otherwise installed in the bilge, wherein the presence of liquid is only detected as a result of simultaneous contact by the liquid with both the first sensor and the second sensor, and wherein a portion of each liquid detection sensor extends outside of the cube-shaped housing such that each liquid detection sensor is capable of detecting the presence of liquid that is outside of the cube-shaped housing;

a microprocessing unit, wherein said microprocessing unit is fully contained within the cube-shaped housing and is coupled to the liquid detection sensors;

a power unit, fully contained within the cube-shaped housing comprising one or more alkaline batteries;

a GSM module, fully contained within the cube-shaped housing, wherein said GSM module is coupled to the microprocessing unit and is capable of transmitting an SMS text message over a wireless communications network wherein the SMS text message includes a notification that the liquid detection sensors have detected the presence of a liquid;

a power control and conversion unit, fully contained within the housing, that regulates connections between the power unit and the microprocessing unit and between the power unit and the GSM module;

a SIM card, fully contained within the housing, that is coupled to the GSM module;

and an LED visible from the exterior of the cube-shaped housing that illuminates when the apparatus is functioning.

13. A method comprising:

detecting a presence of a liquid using an electrically powered device, wherein said device comprises:

a sealed waterproof shock-resistant generally cube-shaped housing having at least one set of volume diagonally opposed first and second corners on opposite sides of the housing;

a power unit contained within the housing;

a first liquid sensor disposed at the first housing corner and a second liquid sensor disposed at the second housing corner, wherein a portion of each of the liquid sensors extends outside the housing, and wherein the presence of a liquid is only detected as a result of simultaneous contact by the liquid with both the first liquid sensor and the second liquid sensor; and a communication unit contained within the housing;

positioning a device in the bilge of a marine vessel in a manner that prevents liquid from initially coming into contact with the first and second liquid sensors simultaneously when the vessel is at rest, and such that the device is easily removable from the bilge and is not permanently affixed to a surface in the bilge or otherwise installed in the bilge;

generating an alert message directed to a remote device responsive to the detection of a liquid;

establishing a connection with a communication network; and transmitting the alert.

14. The method of claim 13, wherein the connection with a communication network is established in response to the detection of a liquid.

15. The method of claim 13, wherein the alert message comprises:

a notification of the presence of a liquid; and information that indicates the remaining battery life of a device monitoring for the presence of a liquid.

16. The method of claim 13, further comprising powering a liquid detection sensor using a battery.

17. The method of claim 13, further comprising: detecting a low power condition for the electrically powered device; and transmitting a low power alert to the remote device responsive to the detection of the low power condition.

18. The method of claim 13, further comprising: detecting a low battery power condition for the electrically powered device; and transmitting a low power alert to the remote device responsive to the detection of the low battery power condition.

* * * * *